(12) United States Patent  (10) Patent No.: US 8,144,733 B2
Fischer et al.  (45) Date of Patent: Mar. 27, 2012

(54) PARTITIONED MEDIUM ACCESS CONTROL IMPLEMENTATION

(75) Inventors: Michael Andrew Fischer, San Antonio, TX (US); Timothy Gordon Godfrey, Overland Park, KS (US)

(73) Assignee: Intellectual Ventures I LLC, Wilmington, DE (US)

( * ) Notice: Subject to any disclaimer, the term of this patent is extended or adjusted under 35 U.S.C. 154(b) by 734 days.

(21) Appl. No.: 12/172,811

(22) Filed: Jul. 14, 2008

(65) Prior Publication Data

US 2010/0002717 A1  Jan. 7, 2010

Related U.S. Application Data

(63) Continuation of application No. 10/701,126, filed on Nov. 4, 2003, now Pat. No. 7,400,640, which is a continuation-in-part of application No. 10/421,265, filed on Apr. 23, 2003, now abandoned.

(60) Provisional application No. 60/377,679, filed on May 3, 2002.

(51) Int. Cl.
*H04J 3/16* (2006.01)
*H04J 3/22* (2006.01)

(52) U.S. Cl. .................... 370/469; 370/463; 370/438

(58) Field of Classification Search .................. None
See application file for complete search history.

(56) References Cited

U.S. PATENT DOCUMENTS

| | | | |
|---|---|---|---|
| 5,748,634 A * | 5/1998 | Sokol et al. ............... | 370/402 |
| 6,052,580 A | 4/2000 | Khakoo | |
| 6,067,300 A * | 5/2000 | Baumert et al. ............ | 370/413 |
| 6,208,616 B1 | 3/2001 | Mahalingam et al. | |
| 6,640,105 B1 * | 10/2003 | Shin ............................. | 455/453 |
| 6,697,873 B1 * | 2/2004 | Yik et al. ................... | 709/238 |
| 6,765,885 B2 | 7/2004 | Jiang et al. | |
| 6,799,054 B2 | 9/2004 | Shpak | |
| 6,847,654 B2 | 1/2005 | Zegelin | |
| 6,891,887 B1 | 5/2005 | Dobson | |
| 6,904,016 B2 | 6/2005 | Kuo et al. | |
| 7,006,522 B1 * | 2/2006 | Wang et al. ................ | 370/463 |
| 7,095,708 B1 | 8/2006 | Alamouti et al. | |

(Continued)

FOREIGN PATENT DOCUMENTS

WO  97/00568  1/1997

OTHER PUBLICATIONS

Bianchi et al., "A Programmable MAC" Universal Personal Communications, 1998. ICUPC '98. IEEE 1998 International Conf. Florence, Italy Oct. 5, 1998, NY, NY pp. 953-957.

Hwang, Wen-shyang et al., "Distributed Multichannel Manufacturing Automation Protocol Network," Communications on the Move, vol. 2 Nov. 1992, pp. 507-511.

International Preliminary Report on Patentability for PCT/US2003/013766 completed May 24, 2005.

(Continued)

*Primary Examiner* — Chuong T Ho

(57) ABSTRACT

A novel implementation of a partitioned Medium Access Control (MAC) is disclosed. The illustrative embodiment employs a shared bus that typically is already present in a wireless terminal for communication between an Upper MAC and a Lower MAC. The partitioned MAC implementation therefore does not require any additional communication means between the Upper MAC and Lower MAC, resulting in a lower-cost system. In addition, the Upper MAC and Lower MAC pass native data structures by reference over the shared bus, thereby eliminating the need for drivers to coordinate communication via interrupts, handshaking, etc. The partitioned MAC implementation results in a cost-effective distributed architecture in which the Upper MAC resides in the terminal's host processor and the Lower MAC resides in the terminal's wireless station.

17 Claims, 8 Drawing Sheets

U.S. PATENT DOCUMENTS

| | | | |
|---|---|---|---|
| 7,116,667 B2 | 10/2006 | Jiang et al. | |
| 7,142,557 B2 | 11/2006 | Dhir et al. | |
| 2001/0055283 A1 | 12/2001 | Beach | |
| 2002/0001296 A1 | 1/2002 | Lee et al. | |
| 2002/0001314 A1 | 1/2002 | Yi et al. | |
| 2002/0080818 A1 | 6/2002 | Zegelin | |
| 2003/0099305 A1 | 5/2003 | Yi et al. | |
| 2003/0171114 A1 | 9/2003 | Hastings | |
| 2003/0190932 A1 | 10/2003 | Pulkkinen et al. | |
| 2003/0206543 A1 | 11/2003 | Fischer et al. | |
| 2005/0089062 A1* | 4/2005 | Zegelin | 370/463 |

OTHER PUBLICATIONS

International Preliminary Report on Patentability for PCT/US2004/003483, issued Aug. 12, 2005.

International Search Report for PCT/US2003/013766, mailed Oct. 23, 2003.

International Search Report for PCT/US2004/003483, mailed Jul. 9, 2004.

Zongjun, Zhang et al, "Simulation Analysis of the Air Interface Protocol for TETRA System," Communications 2001, pp. 558-561.

* cited by examiner

PARTITIONED MEDIUM ACCESS CONTROL IMPLEMENTATION

REFERENCE TO RELATED APPLICATIONS

This application is a continuation of prior application Ser. No. 10/701,126, filed on Nov. 4, 2003, now U.S. Pat. No. 7,400,640 which is a continuation-in-part of application Ser. No. 10/421,265, filed on Apr. 23, 2003, now abandoned which claims the benefit of provisional application No. 60/377,679, filed May 3, 2002, the entire contents of each which are incorporated by reference.

FIELD OF THE INVENTION

The present invention relates to telecommunications in general, and, more particularly, to a novel medium access control architecture.

BACKGROUND OF THE INVENTION

FIG. 1 depicts a schematic diagram of a wireless local area network in the prior art, which comprises: terminal 101-1, terminal 101-2, and terminal 101-3. Before terminals 101-1, 101-2, and 101-3 can communicate with each other, there must be an agreement between the terminals as to the meaning of the signals that they transmit. For example, the terminals must agree on who talks when, what constitutes a "0" and a "1," how is an error detected and corrected, etc. In the terminology of telecommunications, this agreement is called a protocol.

The terminals in a local area network share a communications channel such that if two or more of the terminals transmit into the channel simultaneously, a cacophony results and all of the transmissions are corrupted. Therefore, a local area network protocol includes a mechanism for ensuring that only one terminal at a time transmits into the shared-communications channel. This mechanism is known as Medium Access Control. In some implementations, Medium Access Control can provide additional services such as message encryption and authentication, as well as quality of service (QoS) provisioning and power conservation.

FIG. 2 depicts a schematic diagram of wireless terminal 101-$i$, wherein i is a member of the set $\{1, 2, 3\}$, in the prior art. As shown in FIG. 2, wireless terminal 101-$i$ comprises: a host computing device 201 and a wireless station 202, interconnected as shown. Host computing device 201 is a notebook computer, personal digital assistant (PDA), etc. Host computing device 201 sends data to wireless station 202 for transmission to other wireless terminals, and similarly, wireless station 202 receives data from other wireless terminals and sends these data to host computing device 201. Wireless station 202 thus enables host computing device 201 to communicate in wireless fashion with other terminals.

FIG. 3 depicts a conceptual architectural diagram of wireless station 202 in accordance with the prior art. As shown in FIG. 3, wireless station 202 comprises: processor 303, memory 304, higher-layers module 305, Logical Link Control (LLC) 310, Medium Access Control (MAC) 320, Physical Control 330, transmitter 340, and receiver 350, interconnected as shown.

Processor 303 is a general-purpose processor that is capable of executing instructions stored in memory 304, and of reading data from and writing data into memory 304. Memory 304 is capable of storing programs and data used by processor 303, as is well-known in the art, and might be any combination of random-access memory (RAM), flash memory, disk drive, etc. Higher-layers module 305 is capable of executing the tasks associated with the transport, session, presentation, and application layers of the Open Systems Interconnect (OSI) reference model, as is well-known in the art.

Logical Link Control (LLC) 310 performs a variety of tasks, including (i) multiplexing data packets; (ii) sending multiplexed data packets to Medium Access Control 320 via output 311; (iii) receiving packets from Medium Access Control 320 via link 311; (iv) demultiplexing the packets received via input 312; (v) establishing and maintaining logical point-to-point connections over the shared-communications channel; and (vi) provisioning acknowledgements for individual messages on behalf of those network protocols that require such connection-oriented or acknowledged connectionless services, as is well-known in the art.

Medium Access Control 320 performs the channel access function, which ensures that only one terminal at a time can transmit signals onto the shared-communications channel, as well as frame addressing and detection, generating and checking frame check sequences, and delimiting Logical Link control protocol data units, as is well-known in the art. In addition, Medium Access Control may provide additional services including encryption, authentication, and Quality-of-Service (QoS) provisioning, as well as related, non-communication functions such as power management, as is well-known in the art.

Physical (PHY) Control 330 administers the physical transmission of signals to other terminals and the physical receipt of signals from other terminals via the network medium (e.g., radio, Ethernet, etc.), as is well-known in the art. As shown in FIG. 3, Physical Control 330 (i) receives data from Medium Access Control 320 via input/output 321; (ii) sends data to transmitter 340 for wireless transmission to other terminals; (iii) receives data from other terminals via receiver 350; and (iv) passes data to Medium Access Control 320 via input/output 321.

Transmitter 340 is a hybrid analog and digital circuit that is capable of receiving data from Physical Control 330 and of transmitting data wirelessly into a shared-communications channel. Receiver 350 is a hybrid analog and digital circuit that is capable of receiving data wirelessly via a shared-communications channel and relaying data to Physical Control 330.

As described above, Medium Access Control 320 is theoretically decoupled from the mechanism for controlling the physical (i.e., radio) transmission and receipt of message signals (referred to throughout this specification as the "Physical Control"). In practice, however, in some wireless local area networks, such as those that conform to the Institute of Electrical and Electronics Engineers (IEEE) 802.11 standard, the Medium Access Control and the Physical Control are inextricably intertwined.

In order to mitigate the interdependence between Medium Access Control 320 and Physical Control 330, U.S. patent application Ser. No. 10/421,265, entitled "Partitioned Medium Access Control," discloses a Medium Access Control that is bifurcated into (i) an Upper Medium Access Control that provides those medium-access-control services that are independent of the Physical Control, and (ii) a Lower Medium Access Control that provides those medium-access-control services that are dependent on the Physical Control. This is especially advantageous for IEEE 802.11 wireless networks because it enables the standardization, development, and implementation of some of the medium-access-control services to be decoupled from the standardization, development, and implementation of the Physical Control, while maintaining full compatibility with the installed base of existing IEEE 802.11 equipment. This decoupling can result in the savings of tens or hundreds of millions of dollars to semiconductor, computer, and networking companies.

FIG. 4 depicts a conceptual architectural diagram of the partitioned Medium Access Control disclosed in U.S. patent application Ser. No. 10/421,265. As shown in FIG. 4, Medium Access Control 320 is partitioned into Upper Medium Access Control 410 and Lower Medium Access Control 420, interconnected as shown. Upper Medium Access Control 410 provides a subset of medium-access-control services that are independent of Physical Control 330, including transmit queueing, encryption, decryption, authentication, association, re-association, scanning, distribution, and traffic categorization (for the purposes of, for example but without limitation, quality-of-service (QoS) provisioning), as is well-known in the art. The Upper Medium Access Control may also perform those functions within MAC data service and MAC management service that are independent of Physical Control 330, including power management, queue management, duplicate detection and filtering, fragmentation, defragmentation, queue management.

Lower Medium Access Control 420 provides remaining medium-access-control services (i.e., those that are dependent on Physical Control 330), including channel access, receive validation (e.g., frame control sequence, forward error correction, etc.), and those that involve hard real-time functions and/or are physical layer-implementation dependent, such as response control (e.g., clear-to-send [CTS], acknowledgement [ACK], etc.), as are well-known in the art.

There are four criteria for determining which functions belong to lower Medium Access Control 420:
  i. Functions that are specific to a given physical layer or given type of physical layer;
  ii. Functions that require knowledge of the internal state of the physical layer or knowledge of implementation-specific operational characteristics of the physical layer;
  iii. Hard real-time functions necessary to generate conformant communication (signaling) sequences as viewed on the (wireless) medium; and
  iv. Particular other functions that "belong" in the Lower Medium Access Control because of general implementation considerations, or because a party with sufficient clout (e.g., Microsoft, etc.) wants them to be there.

SUMMARY OF THE INVENTION

The present invention recognizes that the bifurcation of the Medium Access Control into Upper and Lower Medium Access Controls, while providing the advantages described above, also imposes two demands on the Medium Access Control architecture. First, it requires means for transferring data between the Upper and Lower Medium Access Controls, which might increase the cost of the wireless station (e.g., by adding a dedicated communication interface, etc.) or might consume precious existing connectivity resources. Second, it requires means for coordinating the transfer of data between the Upper and Lower Medium Access Controls (e.g., interrupts, handshaking, etc.), which typically requires an additional layer of software (e.g., drivers, etc.), and, therefore, increases the complexity of designing, maintaining, and modifying the wireless station.

The illustrative embodiment of the present invention is a partitioned Medium Access Control architecture that addresses these two demands. In particular, the Upper and Lower Medium Access Controls communicate via a bus that is already present in wireless terminals for transferring data between the host processor (i.e., the processor of the host device) and one or more peripherals (e.g., the wireless station, a printer, a memory, etc.). This enables the Upper and Lower Medium Access Controls to transfer data without adding any communication means to the wireless station. In addition, the illustrative embodiment utilizes the memory-mapped master mode of the bus to pass native data structures between the Upper and Lower Medium Access Controls by reference (i.e., by passing their memory addresses), thereby reducing some of the software required for coordinating data transfer.

Furthermore, the illustrative embodiment of the present invention recognizes that since
  (i) the integrated circuit for the host processor typically has a significant number of unused transistors, and
  (ii) the Upper Medium Access Control is independent of the Lower Medium Access Control and of the Physical Control, and
  (iii) the bus enables communication between the host computing device and the wireless station,
then the Upper Medium Access Control can be embedded along with the Logical Link Control and higher layers into the host processor's integrated circuit and software, resulting in a lower-cost implementation.

For the purposes of this specification, the term "peripheral" is defined as an auxiliary apparatus (e.g., an input/output device, a memory, etc.). For the purposes of this specification, the term "shared bus" is defined as a bus that enables the transfer of signals between a processor and one or more peripherals. As is well-known in the art, signals can be transferred between a shared bus and a peripheral via an input/output controller, for example, or by a direct connection.

The illustrative embodiment comprises: (a) a processor for generating an outgoing message to be transmitted to a remote terminal via a first service data unit; (b) a first circuit for: providing a first medium-access-control service, and generating a first protocol data unit based on the first service data unit; (c) a second circuit for: providing a second medium-access-control service, and generating a second protocol data unit based on the first protocol data unit; (d) a Physical Control for: generating a third protocol data unit based on the second protocol data unit, and transmitting a first signal based on the third protocol data unit to the remote terminal; and (e) a bus for: transferring signals between the processor and a peripheral, and transferring the first protocol data unit from the first circuit to the second circuit.

DETAILED DESCRIPTION

Figure 1:
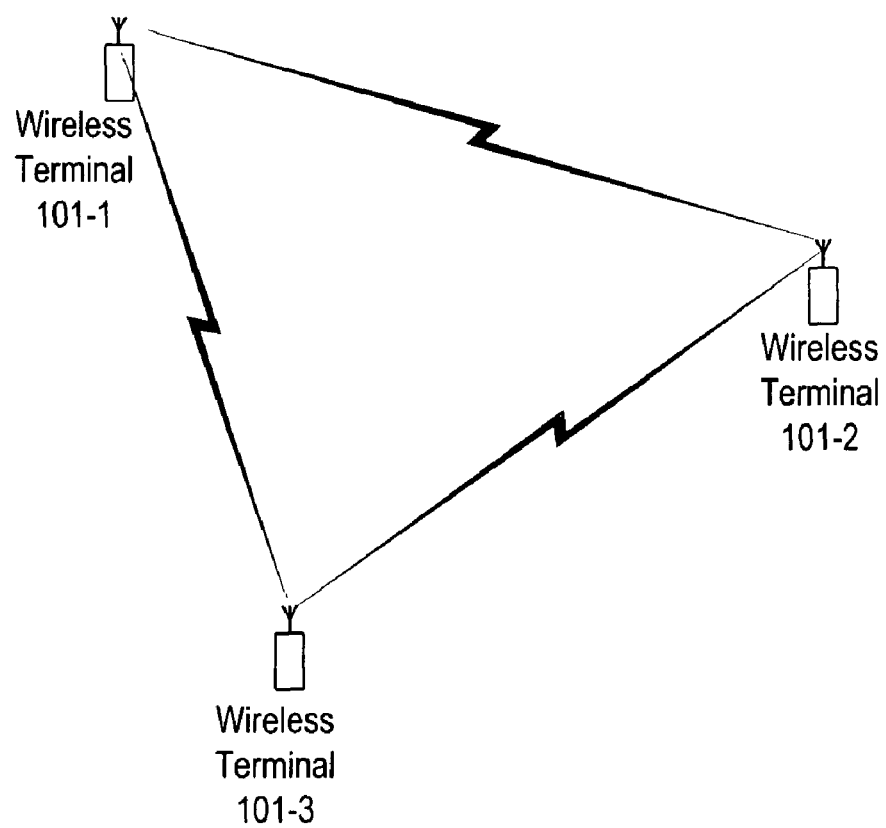
FIG. 1 depicts a schematic diagram of wireless local area network 100 in accordance with the prior art.
Figure 2:
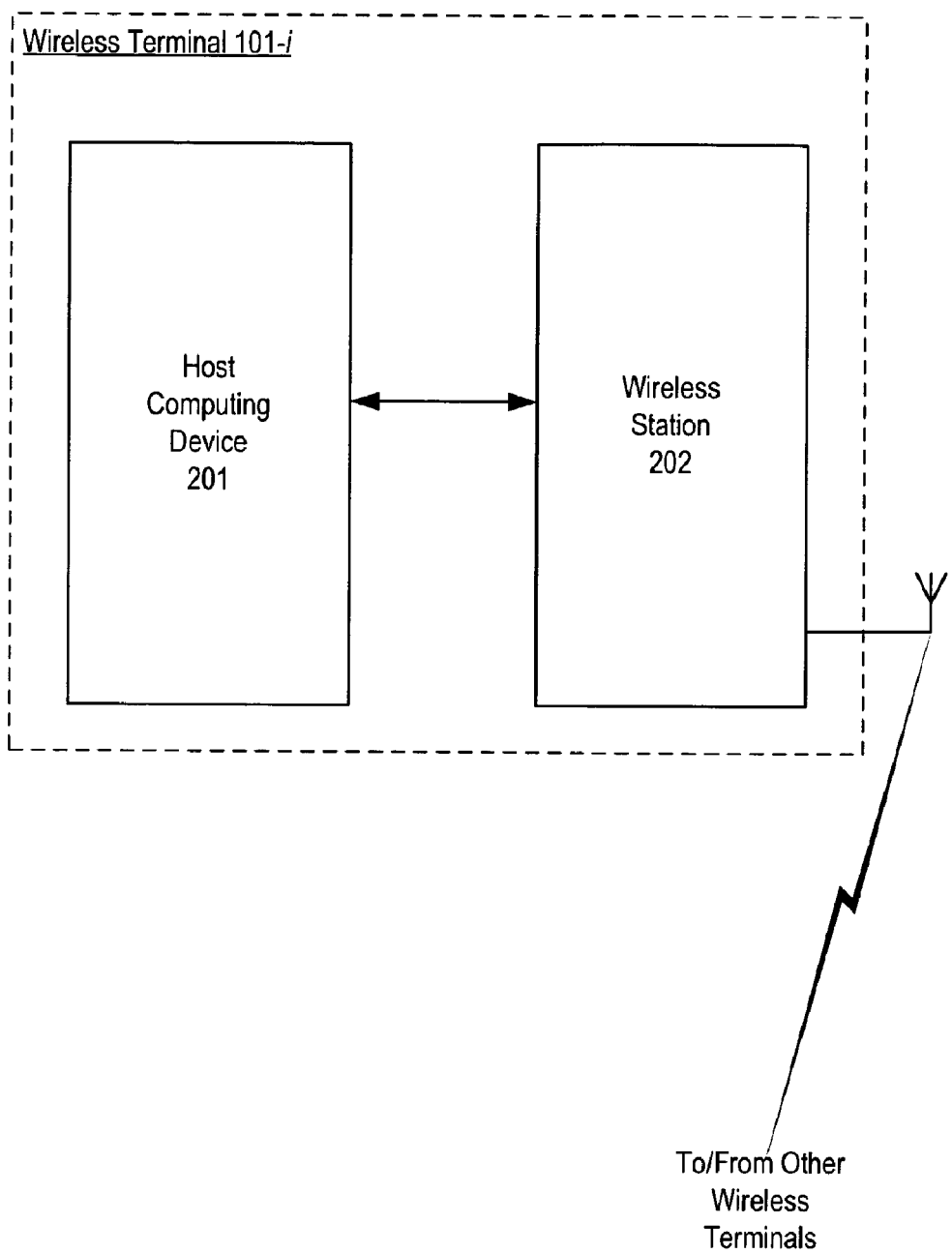
FIG. 2 depicts a schematic diagram of wireless terminal 101-$i$, as shown in FIG. 1, in the prior art.
Figure 3:
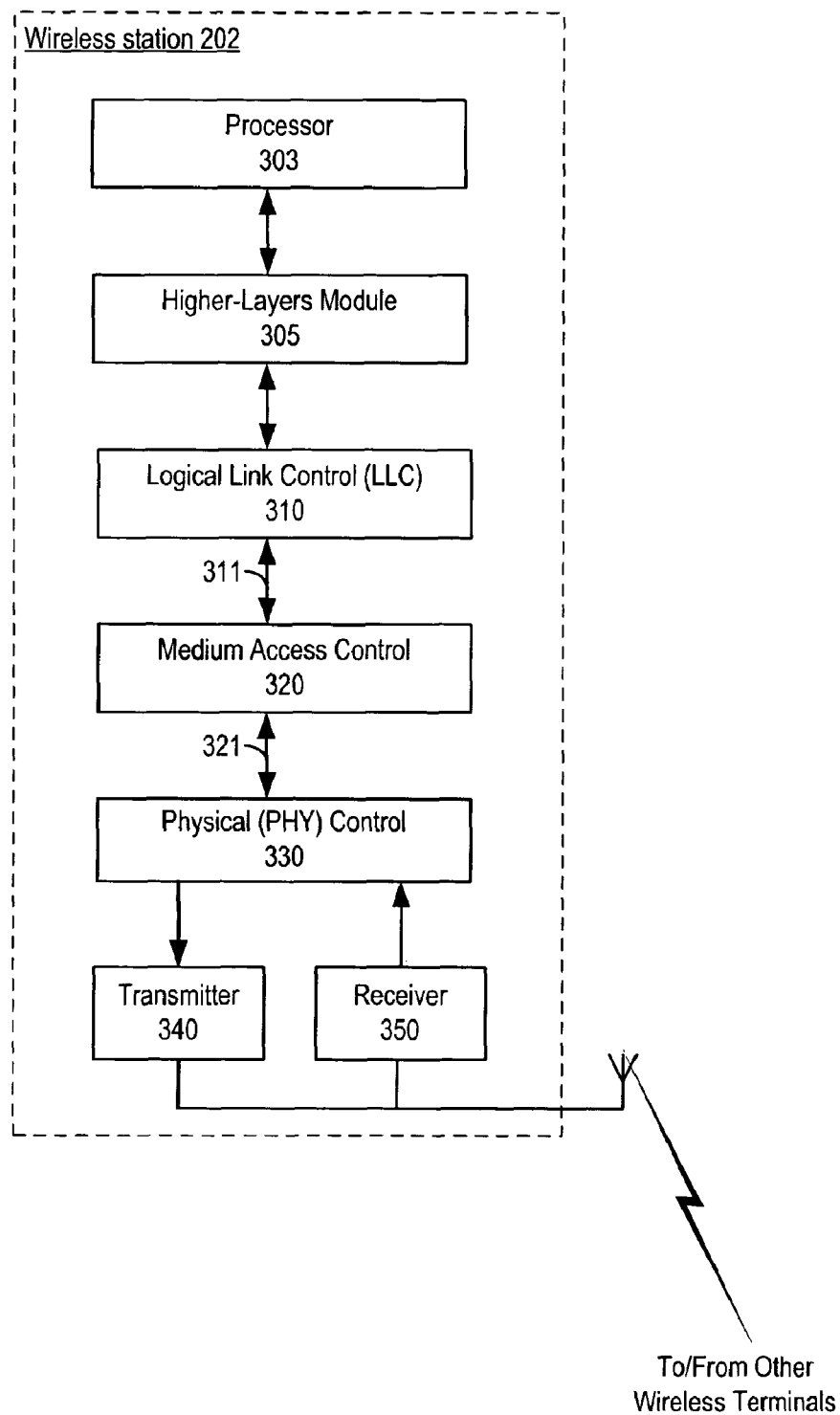
FIG. 3 depicts a conceptual architectural diagram of wireless station 202, as shown in FIG. 2, in accordance with the prior art.
Figure 4:
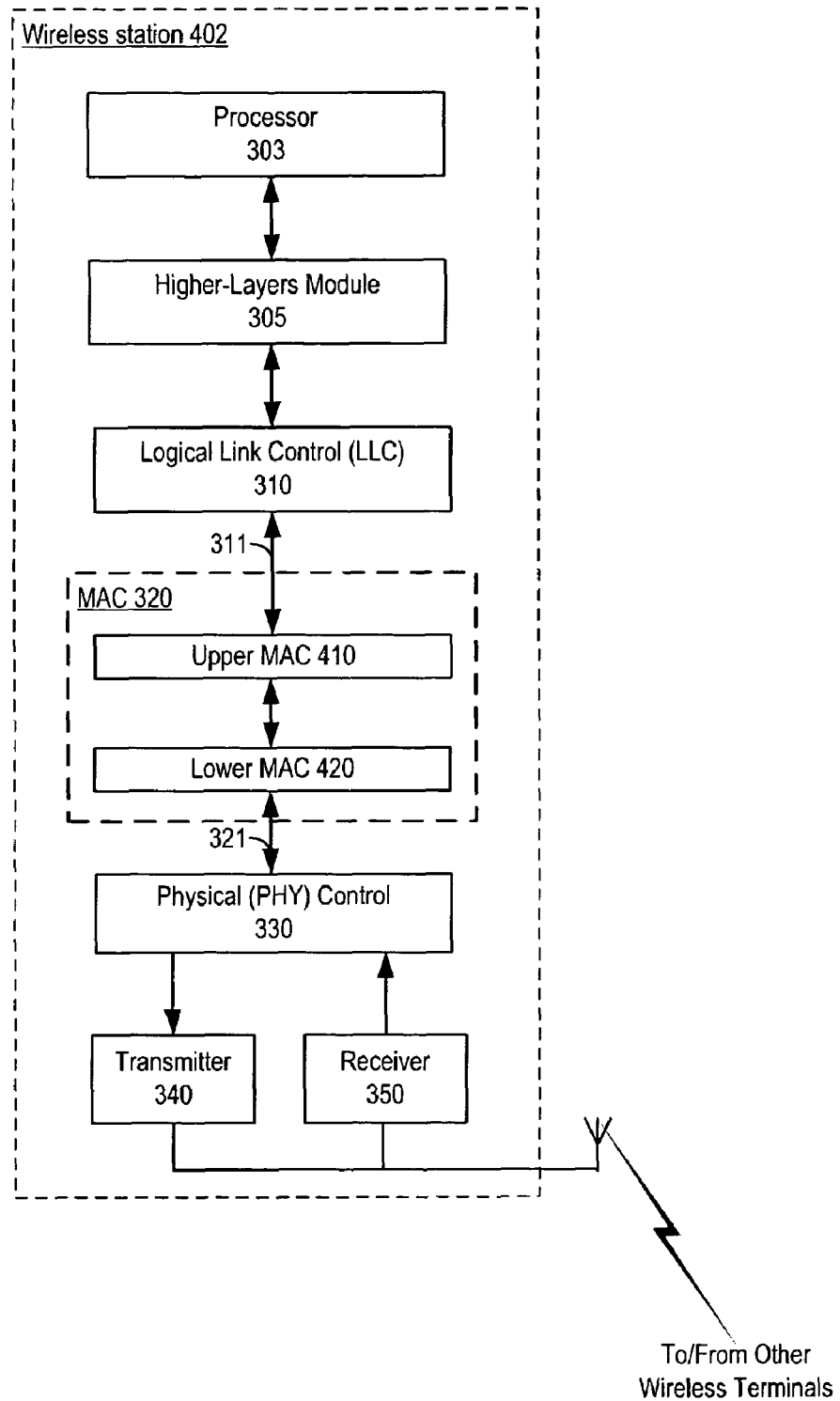
FIG. 4 depicts a conceptual architectural diagram of the partitioned Medium Access Control disclosed in U.S. patent application Ser. No. 10/421,265.
Figure 5:
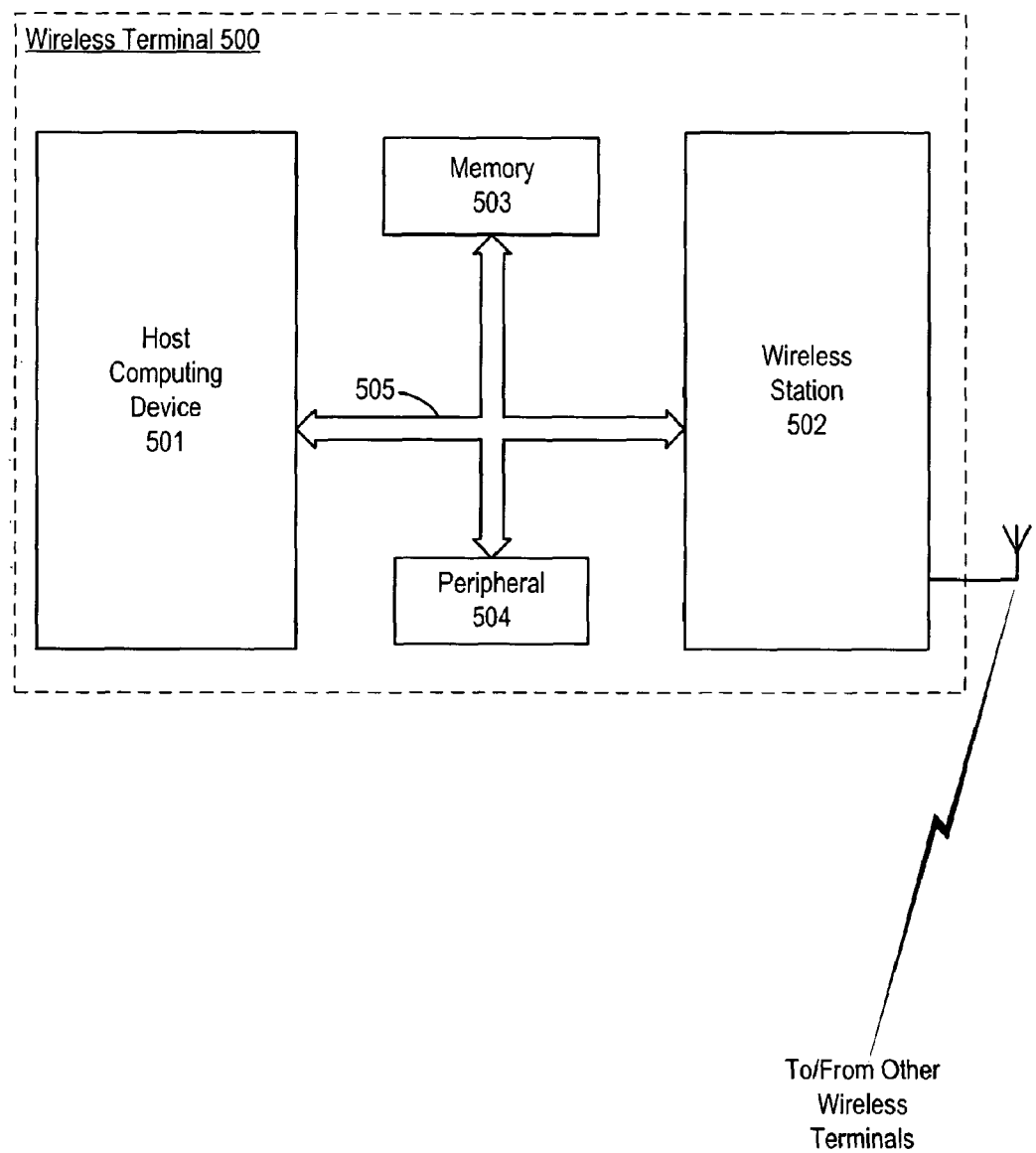
FIG. 5 depicts a schematic diagram of a wireless terminal in accordance with the illustrative embodiment of the present invention.

FIG. 5 depicts a schematic diagram of the salient components of wireless terminal 500 in accordance with the illustrative embodiment of the present invention. Wireless terminal 500 comprises: host computing device 501, wireless station 502, memory 503, and printer peripheral 504, interconnected by shared bus 505.

Host computing device 501 sends data to wireless station 502 for transmission to other wireless terminals, and similarly, wireless station 502 receives data from other wireless terminals and sends these data to host computing device 501.

Memory 503 is capable of storing programs and data used by processor 503, as is well-known in the art, and might be any combination of random-access memory (RAM), flash memory, disk drive, etc. As is well-known in the art, in some embodiments signals might be transferred between shared bus 505 and memory 503 via an input/output controller (not shown in FIG. 5), while in some embodiments signals might be transferred between shared bus 505 and memory 503 via a direct connection. It will be clear to those skilled in the art, after reading this specification, how to make and use memory 503.

Peripheral 504 is an input/output device such as a keyboard, display, or printer. In some embodiments signals might be transferred between shared bus 505 and peripheral 504 via an input/output controller (not shown in FIG. 5), while in some embodiments signals might be transferred between shared bus 505 and peripheral 504 via a direct connection.

Shared bus 505 enables communications between host computing device 501 and other peripherals (e.g., disk drives, printers, etc.), as is well-known in the art. As shown in FIG. 5, shared bus 505 also enables bi-directional communications between host computing device 501, wireless station 502, and memory 503.

Figure 6:
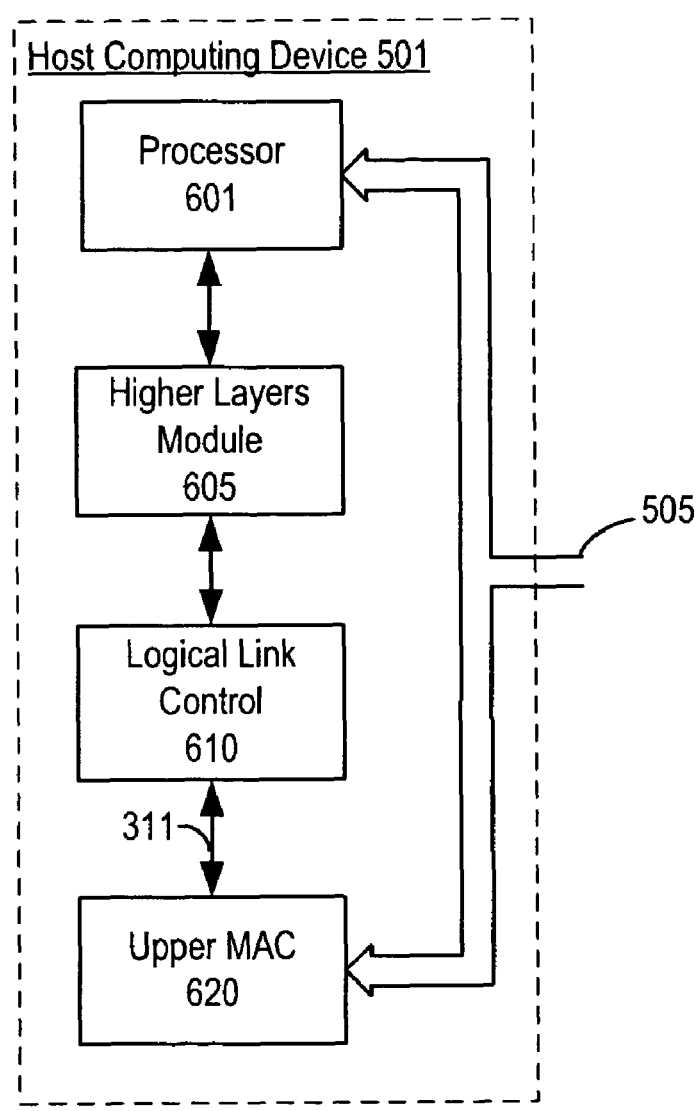
FIG. 6 depicts a block diagram of host computing device 501, as shown in FIG. 5, in accordance with the illustrative embodiment of the present invention.

FIG. 6 depicts a block diagram of the salient components of host computing device 501 in accordance with the illustrative embodiment of the present invention. Host computing device 501 comprises: processor 601, higher-layers module 605, logical link control (LLC) 610, and Upper Medium Access Control 620, interconnected as shown.

Processor 601 is a general-purpose processor that is capable of executing instructions and transferring data to and from memory via bus 505, in well-known fashion. As shown in FIG. 6, processor 601 sends data to and receives data from higher-layers module 605.

Higher-layers module 605 is identical to higher-layers module 305; it will be clear to those skilled in the art how to make and use higher-layers module 605.

Logical-link control 610 is identical to Logical-link control 310; it will be clear to those skilled in the art how to make and use Logical-link control 610.

Upper Medium Access Control 620 is the same as Upper Medium Access Control 410 except that it communicates with the Lower Medium Access Control by passing data by reference via shared bus 505 and memory 503. Upper Medium Access Control 620 sends data to Lower Medium Access Control 710 (which is located in wireless station 502 and is described below) by storing the data at an address in memory 503 via shared bus 505, and then sending the address to Lower Medium Access Control 710 via shared bus 505. Similarly, Upper Medium Access Control 620 receives data from the Lower Medium Access Control by receiving an address via shared bus 505, and then fetching via shared bus 505 the data at that address in memory 503.

Figure 7:
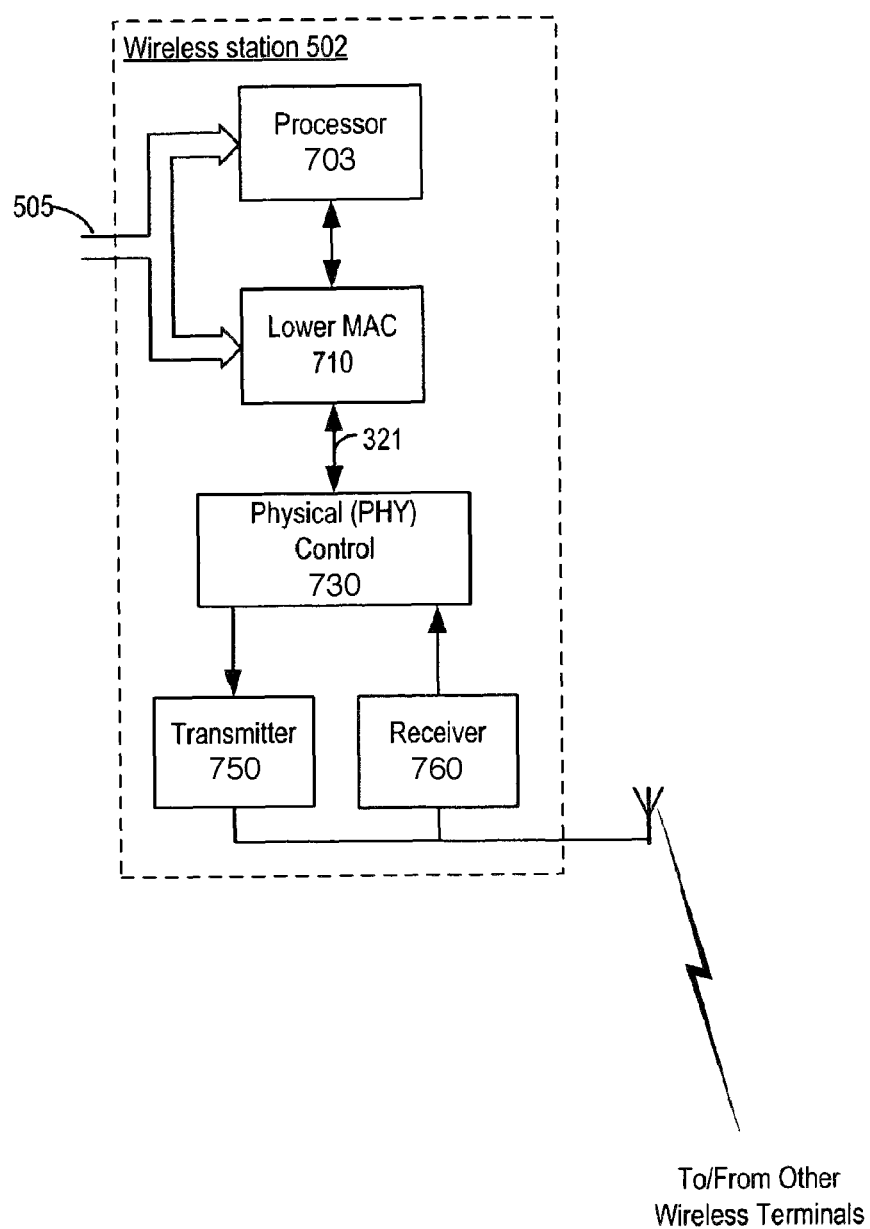
FIG. 7 depicts a block diagram of wireless station 502, as shown in FIG. 5, in accordance with the illustrative embodiment of the present invention.

FIG. 7 depicts a block diagram of the salient components of wireless station 502 in accordance with the illustrative embodiment of the present invention. Wireless station 502 comprises: processor 703, Lower Medium Access Control 710, Physical Control 730, transmitter 740, and receiver 750, interconnected as shown.

Processor 703 is identical to processor 303; it will be clear to those skilled in the art how to make and use processor 703.

Lower Medium Access Control 710 is the same as Lower Medium Access Control 420 except that it communicates with the Upper Medium Access Control by passing data by reference via shared bus 505 and memory 503. Lower Medium Access Control 710 sends data to Upper Medium Access Control 620 by storing the data at an address in memory 503 via shared bus 505, and then sending the address to Upper Medium Access Control 620 via shared bus 505. Similarly, Lower Medium Access Control 710 receives data from Upper Medium Access Control 620 by receiving an address via shared bus 505, and then fetching via shared bus 505 the data at that address in memory 503.

Physical Control 730 is identical to physical control 330; it will be clear to those skilled in the art how to make and use Physical Control 730.

Transmitter 740 is identical to transmitter 340; it will be clear to those skilled in the art how to make and use transmitter 740.

Receiver 750 is identical to receiver 350; it will be clear to those skilled in the art how to make and use receiver 750.

Figure 8:
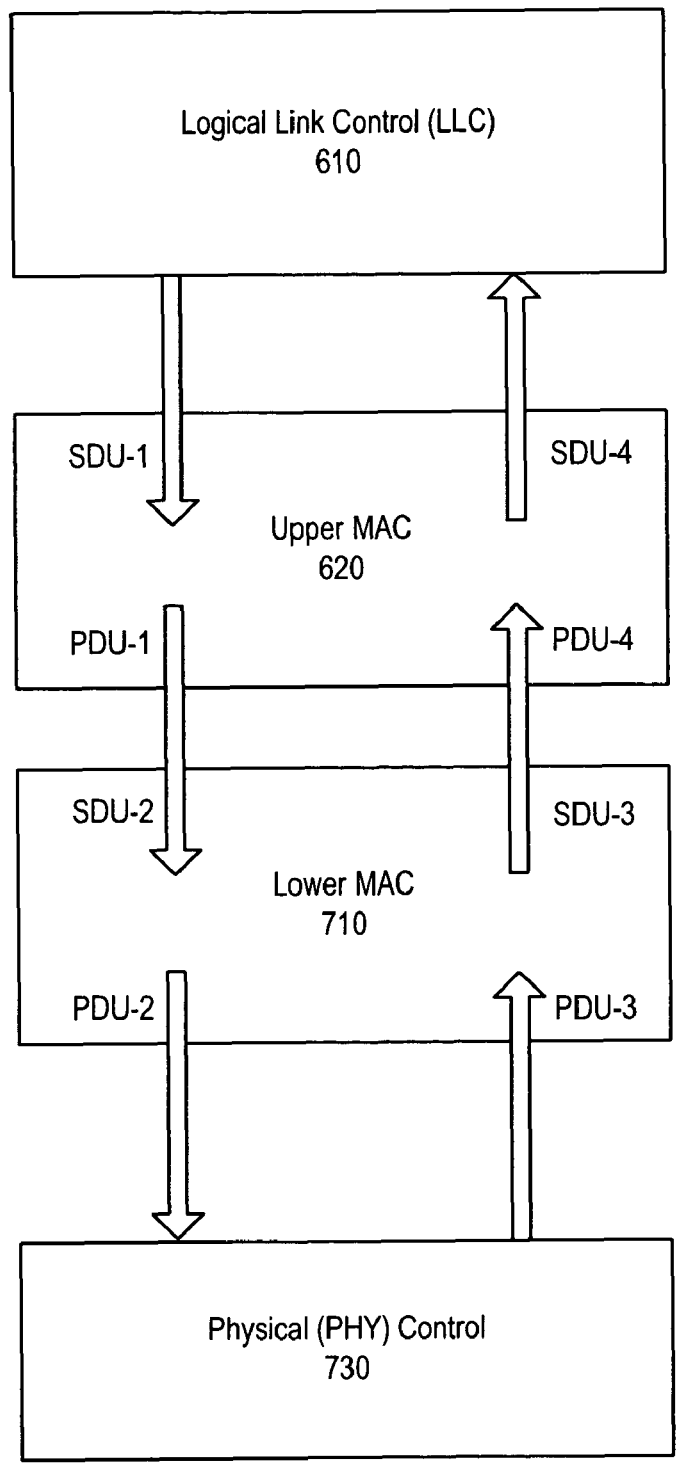
FIG. 8 depicts a data-flow diagram for the illustrative embodiment of the present invention.

FIG. 8 depicts data-flow diagram 800 for the illustrative embodiment of the present invention. As shown in FIG. 8, Upper Medium Access Control 620 receives a service data unit (SDU-1) from Logical Link Control 610; performs the appropriate functions with respect to SDU-1 in accordance with the requested service (i.e., functions without hard real-time constraints and independent of Physical Control 730), as is well-understood in the art; generates a protocol data unit (PDU-1); and outputs PDU-1, accompanied in some cases by control information (e.g. desired transmit data rate and/or modulation, packet lifetime or retry limits, transmission priority, etc.) to Lower Medium Access Control 710. Lower Medium Access Control 710 receives PDU-1 as a service data unit (SDU-2); performs the appropriate functions with respect to SDU-2 in accordance with the requested service (i.e., functions with hard real-time constraints and/or dependent on Physical Control 730); generates protocol data unit PDU-2; and outputs PDU-2 and associated control information (e.g. channel selection, modulation type, preamble length, etc.) to Physical Control 730.

Physical Control 730 transmits an outgoing signal based on PDU-2 and receives an incoming signal (e.g., acknowledgement [ACK], etc.), as is well-known in the art, and outputs data and reception status (e.g. received signal strength, signal quality, modulation utilized by sender, etc.) based on the incoming signal to Lower Medium Access Control 710. Lower Medium Access Control 710 receives the outputted data from Physical Control 730 as protocol data unit PDU-3; performs the appropriate functions with respect to PDU-3 and associated reception status in accordance with the indicated service; generates service data unit SDU-3; and outputs SDU-3 to Upper Medium Access Control 620. Upper Medium Access Control 620 receives SDU-3 from Lower Medium Access Control 710 as protocol data unit PDU-4; performs the appropriate functions with respect to PDU-4 in accordance with the indicated service; generates service data unit SDU-4; and outputs SDU-4 to Logical Link Control 610.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A communications device comprising:
   an upper medium access control;
   a lower medium access control;
   a memory; and
   a bus connecting the upper medium access control, the lower medium access control, and the memory;
   wherein the upper medium access control is configured to store data at a first address in the memory via the bus, and to send the first address to the lower medium access control via the bus; and
   wherein the upper medium access control is configured to receive a second address via the bus from the lower medium access control, and to fetch data at the second address in the memory via the bus.

2. The communications device of claim 1, wherein the bus is configured to transmit data to at least one peripheral.

3. The communications device of claim 2, wherein the at least one peripheral is an input/output device selected from the group consisting of a keyboard, a display, and a printer.

4. A method comprising:
   storing, by an upper medium access control of a communication device, data at a first address in a memory via a shared bus;
   sending, from the upper medium access control, information about the first address to a lower medium access control of the communication device via the shared bus;
   receiving, at the upper medium access control, information about a second address from the lower medium access control via the shared bus; and
   obtaining, by the upper medium access control, data in the memory via the shared bus, based on information about the second address.

5. The method of claim 4, wherein a host computing device resident on the communication device comprises the upper medium access control.

6. The method of claim 5, wherein the shared bus is configured to transmit data between the host computing device and at least one peripheral.

7. The method of claim 6, wherein the at least one peripheral is an input/output device selected from the group consisting of a keyboard, a display, and a printer.

8. The method of claim 4, wherein a wireless station resident on the single communications device comprises the lower medium access control.

9. A method comprising:
   storing, by a lower medium access control of a communication device, data at a first address in a memory via a shared bus;
   sending, from the lower medium access control, information about the first address to an upper medium access control of the communication device via the shared bus;
   receiving, at the lower medium access control, information about a second address from the upper medium access control via the shared bus; and
   obtaining, by the lower medium access control, data in the memory via the shared bus, based on information about the second address.

10. The method of claim 9, wherein a host computing device resident on the communication device comprises the upper medium access control.

11. The method of claim 10, wherein the shared bus is configured to transmit data between the host computing device and at least one peripheral.

12. The method of claim 11, wherein the at least one peripheral is an input/output device selected from the group consisting of a keyboard, a display, and a printer.

13. The method of claim 9, wherein a wireless station resident on the communication device comprises the lower medium access control.

14. A non-transitory computer-readable medium having instructions stored thereon, the instructions comprising:
   instructions for storing, by a upper medium access control of a communication device, data at a first address in a memory via a shared bus;
   instructions for sending, from the upper medium access control, information about the first address to a lower medium access control of the communication device via the shared bus;
   instructions for receiving, at the upper medium access control, information about a second address from the lower medium access control of the communication device via the shared bus; and
   instructions for obtaining data at the second address in the memory via the shared bus based on the information about the second address.

15. The non-transitory computer-readable medium of claim 14, wherein the non-transitory computer readable medium comprises the memory.

16. A non-transitory computer-readable medium having instructions stored thereon, the instructions comprising:
   instructions for storing, by a lower medium access control of a communication device, data at a first address in a memory via a shared bus;
   instructions for sending, from the lower medium access control, information about the first address to an upper medium access control of the communication device via the shared bus;
   instructions for receiving, at the lower medium access control, information about a second address from the upper medium access control via the shared bus; and
   instructions for obtaining data at the second address in the memory via the shared bus based on the information about the second address.

17. The non-transitory computer-readable medium of claim 16, wherein the non-transitory computer-readable medium comprises the memory.

* * * * *

UNITED STATES PATENT AND TRADEMARK OFFICE
CERTIFICATE OF CORRECTION

PATENT NO. : 8,144,733 B2  
APPLICATION NO. : 12/172811  
DATED : March 27, 2012  
INVENTOR(S) : Fischer et al.

Page 1 of 1

It is certified that error appears in the above-identified patent and that said Letters Patent is hereby corrected as shown below:

On Page 2, in Item (56), under "OTHER PUBLICATIONS", in Column 2, Line 7, delete "al," and insert -- al., --, therefor.

In the Drawings:

In Fig. 7, Sheet 7 of 8, delete "750" and insert -- 740 --, therefor.

In Fig. 7, Sheet 7 of 8, delete "760" and insert -- 750 --, therefor.

In the Specifications:

In Column 1, Line 8, delete "7,400,640 which" and insert -- 7,400,640, which --, therefor.

In Column 1, Lines 9-10, delete "abandoned which" and insert -- abandoned, which --, therefor.

In Column 1, Line 12, delete "each which" and insert -- which --, therefor.

Signed and Sealed this  
Twenty-fifth Day of September, 2012

David J. Kappos  
*Director of the United States Patent and Trademark Office*